(12) United States Patent
Yanaros et al.

(10) Patent No.: US 8,424,743 B2
(45) Date of Patent: Apr. 23, 2013

(54) SOLDER RETURN FOR WAVE SOLDER NOZZLE

(75) Inventors: Larry Yanaros, Austin, TX (US); Frederick Wagner, Georgetown, TX (US)

(73) Assignee: Flextronics AP, LLC, Broomfield, CO (US)

( * ) Notice: Subject to any disclaimer, the term of this patent is extended or adjusted under 35 U.S.C. 154(b) by 80 days.

(21) Appl. No.: 13/408,958

(22) Filed: Feb. 29, 2012

(65) Prior Publication Data

US 2012/0168488 A1 Jul. 5, 2012

Related U.S. Application Data

(62) Division of application No. 12/725,236, filed on Mar. 16, 2010, now Pat. No. 8,146,792.

(51) Int. Cl.
*B23K 31/02* (2006.01)
(52) U.S. Cl.
USPC .................... 228/33; 228/34; 228/37; 228/43
(58) Field of Classification Search .................... 228/33, 228/34, 37, 43
See application file for complete search history.

(56) References Cited

U.S. PATENT DOCUMENTS

| | | | |
|---|---|---|---|
| 4,171,761 A | 10/1979 | Boldt et al. | |
| 4,802,617 A | 2/1989 | Deambrosio | |
| 5,209,389 A | 5/1993 | Sullivan et al. | |
| 5,368,222 A * | 11/1994 | Scorta | 228/180.1 |
| 5,379,931 A * | 1/1995 | Van Schaik | 228/37 |
| 5,411,197 A | 5/1995 | Nakamura et al. | |
| 5,509,598 A | 4/1996 | Nayar et al. | |
| 5,807,050 A | 9/1998 | Daler et al. | |
| 6,478,215 B2 | 11/2002 | Zen | |
| 2006/0186183 A1 | 8/2006 | Morris | |
| 2008/0302861 A1 | 12/2008 | Szymanowski et al. | |

FOREIGN PATENT DOCUMENTS

| | | |
|---|---|---|
| JP | 05-093654 U | 12/1993 |
| JP | 2000-114708 A | 4/2000 |
| KR | 10-2009-0005388 A | 1/2009 |

* cited by examiner

*Primary Examiner* — Erin Saad
(74) *Attorney, Agent, or Firm* — Marsh Fischmann & Breyfogle LLP

(57) ABSTRACT

A solder return apparatus for a wave solder machine that collects solder exiting a nozzle and returns the solder to a solder reservoir while limiting solder from splashing onto electronic substrates (e.g., printed circuit boards), components of the wave solder machine, and/or the like. The apparatus includes a mounting section that may be placed over an upper surface of the nozzle and a collection section that collects the solder and returns the solder to the solder reservoir. The collection section includes a trough having an opening in a bottom wall of the trough and a flow control member that can adjust a quantity of solder exiting the trough as well as the velocity of the solder exiting the trough. One or more deflection plates can be mounted to extend from the trough into solder in the solder reservoir to further limit splashing solder from reaching unintended locations.

15 Claims, 7 Drawing Sheets

SOLDER RETURN FOR WAVE SOLDER NOZZLE

CROSS REFERENCE TO RELATED APPLICATIONS

This application is a divisional of U.S. patent application Ser. No. 12/725,236, filed on Mar. 16, 2010, entitled "Solder Return for Wave Solder Nozzle," now U.S. Pat. No. 8,146,792, the contents of which are incorporated herein by reference.

BACKGROUND

Fundamental to the electronics manufacturing industry is the requirement to make a series of electrical connections (e.g., with a solder alloy) to create electrical circuits and ultimately a functional device with final assembly. Wave soldering machines allow a large quantity of electrical connections between various components to be quickly and efficiently made. In a wave soldering machine, an electronic substrate is typically moved by a conveyor on an inclined path past a fluxing station, a preheating station, and a station at which at least one wave of solder is caused to well upwardly through a nozzle and contact various portions of the electronic substrate to be soldered.

Wave soldering machines typically utilize tin-lead alloys as the solder material which has been the industry norm for over 40 years. More recently however, tin-lead alloy solder is being replaced with lead-free alloys. Often, this change is mandated by international legislation. With current wave soldering apparatus and methods, the advent of lead-free solders has led to reduced process yields and increased process costs. The ability of currently available equipment and process techniques to accommodate lead-free solders and newer and more challenging products, regardless of the solder alloy, is limited. Additionally, lead-free solders cost more than do tin-lead or other types of solder. As a result, the desire of wave solder operators and owners to reduce the waste of lead-free solders has increased.

SUMMARY

Disclosed herein is an apparatus including a mounting member for mounting the apparatus to a nozzle and a collection member interconnected to the mounting member such that the collection member is operable to receive liquid from the nozzle and pass liquid to a reservoir. The collection member includes a trough for receiving liquid from the nozzle that includes a bottom wall and at least one slot within the bottom wall for allowing liquid to pass out of the trough, and a flow control member that is adjustably mounted below the trough. The bottom wall and the flow control member define a chamber for receiving liquid from the trough and passing liquid into the reservoir.

The mounting member may include an aperture that is sized to rest over a top surface of the nozzle. The aperture may allow liquid to pass from the nozzle into the collection member. The mounting member may include an elongated plate that is sized to substantially cover a top surface of the nozzle and/or may be sized to hang over a front flange of the nozzle.

The trough may include first and second end walls and a front wall, each of which may extend upwardly from the bottom wall. The first and second end walls, the front wall and the bottom wall may define a receiving area for receiving liquid from the nozzle. A deflection plate may be interconnected to the trough and may be operable to extend into the reservoir. The deflection plate may be mounted to the front wall, may be substantially perpendicular to at least one of the bottom wall and the flow control member, and/or may further define the chamber. The front wall may include a hook member on an upper portion thereof opposite from the bottom wall.

The flow control member may include at least one fastener extending substantially perpendicularly therefrom that adjustably interconnects the flow control member to the trough. The at least one fastener may extend through the at least one slot. A mounting tab may be disposed within the at least one slot, and the at least one fastener may extend through the mounting tab. The flow control member may include an elongated plate.

Also disclosed herein is a wave soldering station including a reservoir holding solder, a wave soldering assembly protruding from the reservoir including a solder nozzle, and a collection member interconnected to the solder nozzle that includes a trough for receiving solder from the solder nozzle and an aperture through the trough for returning the solder to the reservoir.

The solder nozzle may include a top surface that includes at least one aperture for expelling solder from the wave soldering assembly, and the collection member may include a mounting member that is attached to the top surface. The solder nozzle may include a front flange that extends from the top surface towards a bottom of the reservoir, and the mounting member may hang over the front flange. The trough may include a bottom wall that is disposed above a surface of solder in the reservoir and below the top surface of the solder nozzle. The bottom wall may be disposed substantially halfway between the surface of solder in the reservoir and the top surface of the solder nozzle.

The collection member may include a deflection plate that generally extends from the bottom wall into the solder in the reservoir. The solder nozzle may include a front surface that extends from the top surface into the reservoir, and the front surface may face the deflection plate. The collection member may further include a flow control member that is adjustably mounted to the trough and that controls a flow rate of solder exiting the aperture. The flow control member may be disposed between the deflection plate and the front wall. The flow control member may be disposed between the bottom wall of the trough and the surface of solder in the reservoir. The deflection plate, the front wall of the solder nozzle, the bottom wall of the trough and the flow control member may define a chamber for receiving solder from the trough.

Also disclosed herein is a method of using a wave solder machine including operating the wave solder machine to pump solder from a solder reservoir through at least one aperture of a solder nozzle to form a solder wave, receiving solder from the solder wave in a trough that is interconnected to the solder nozzle, and allowing the solder to flow through an opening in a bottom wall of the trough. The bottom wall is disposed above a surface of solder in the solder reservoir and below the at least one aperture of the solder nozzle.

After the allowing operation, the method may include receiving the solder on a plate, and allowing the solder to flow from the plate into the solder reservoir. The plate may be disposed above the surface of solder in the solder reservoir and below the bottom wall of the trough. The method may include adjusting the plate at least one of towards and away from the bottom wall of the trough. The method may include moving an electronic substrate over the solder nozzle, and this may include moving a bottom surface of the electronic substrate through the solder wave. The method may include receiving solder from the trough in the reservoir, and continuing to operate the wave solder machine to pump the solder received in the reservoir from the trough through the at least one aperture of the solder nozzle to form the solder wave.

DETAILED DESCRIPTION

Figure 1:
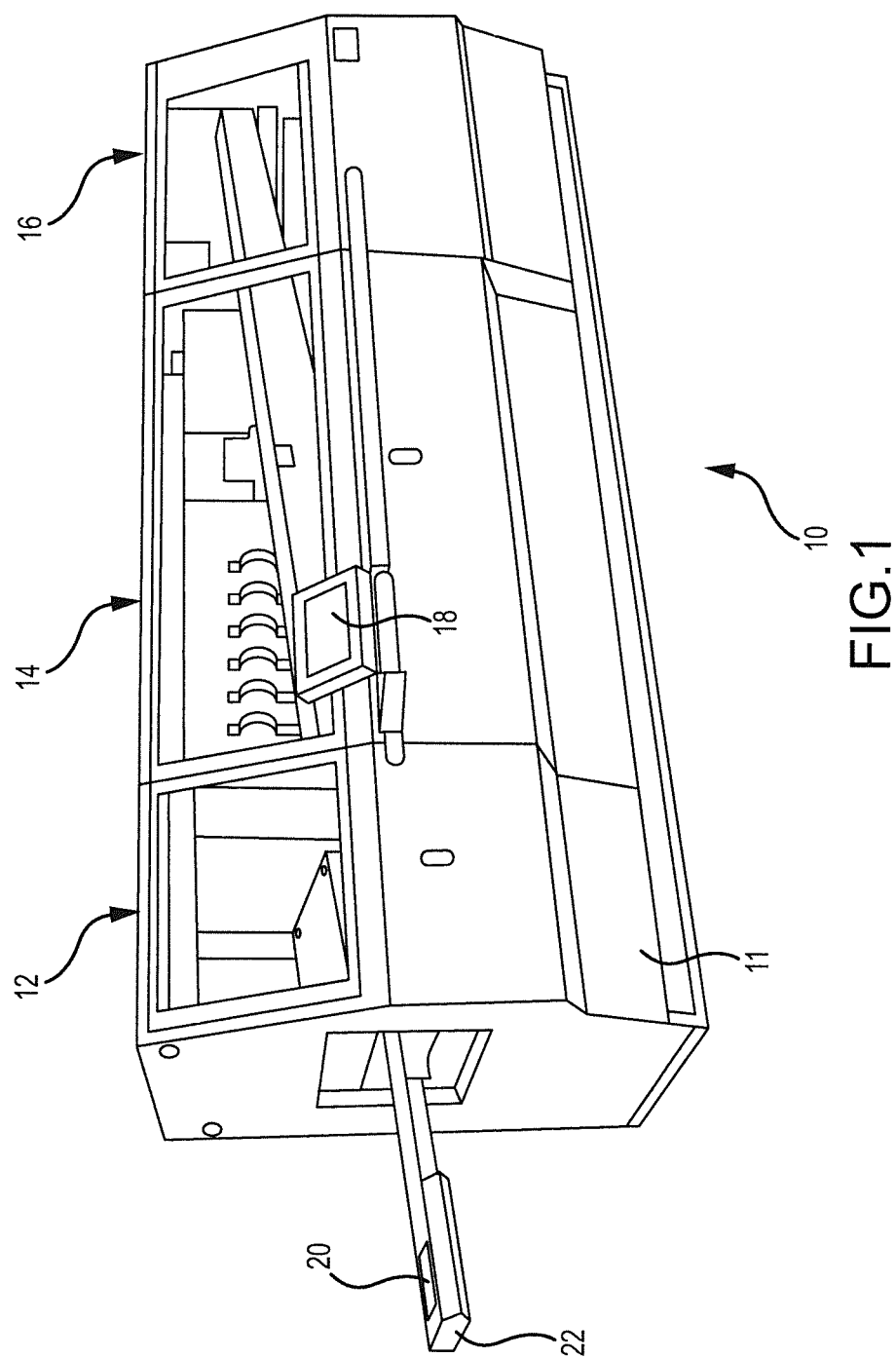
FIG. 1 is a perspective view of a wave soldering machine according to one embodiment.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

FIG. 1 illustrates a perspective view of a wave soldering machine or apparatus 10 according to one embodiment. As shown, the wave soldering apparatus 10 may include a housing 11 that contains a number of working stations such as a flux application station 12, a preheat station 14, and a wave soldering station 16. A controller (not shown) having an operation monitor 18 may control operation of the wave soldering apparatus 10 in a well-known manner. As shown, an electronic substrate 20 (e.g., printed circuit board) may be moved by a conveyor 22 along a path (e.g., inclined) past the flux application station 12, the preheating station 14, and, finally, the wave soldering station 16.

At the flux station 12, any appropriate soldering flux (e.g., 2220-VF and 959 soldering fluxes provided by Kester of Itasca, Ill. and EF-6100 soldering flux provided by Alpha Metals of Jersey City, N.J.) may be applied to a surface of the electronic substrate 20 to be soldered. For instance, soldering flux may be deposited at a rate of less than 600 micrograms of flux solids per square inch of surface area of the electronic substrate. At the preheat station 14, the electronic substrate may be heated to any appropriate temperature (e.g., approximately 100° C.). At the wave soldering station 16, one or more solder waves (not shown in FIG. 1) may be caused to well upwardly out of one or more solder nozzles and contact various portions of the electronic substrate to be soldered.

Figure 2:
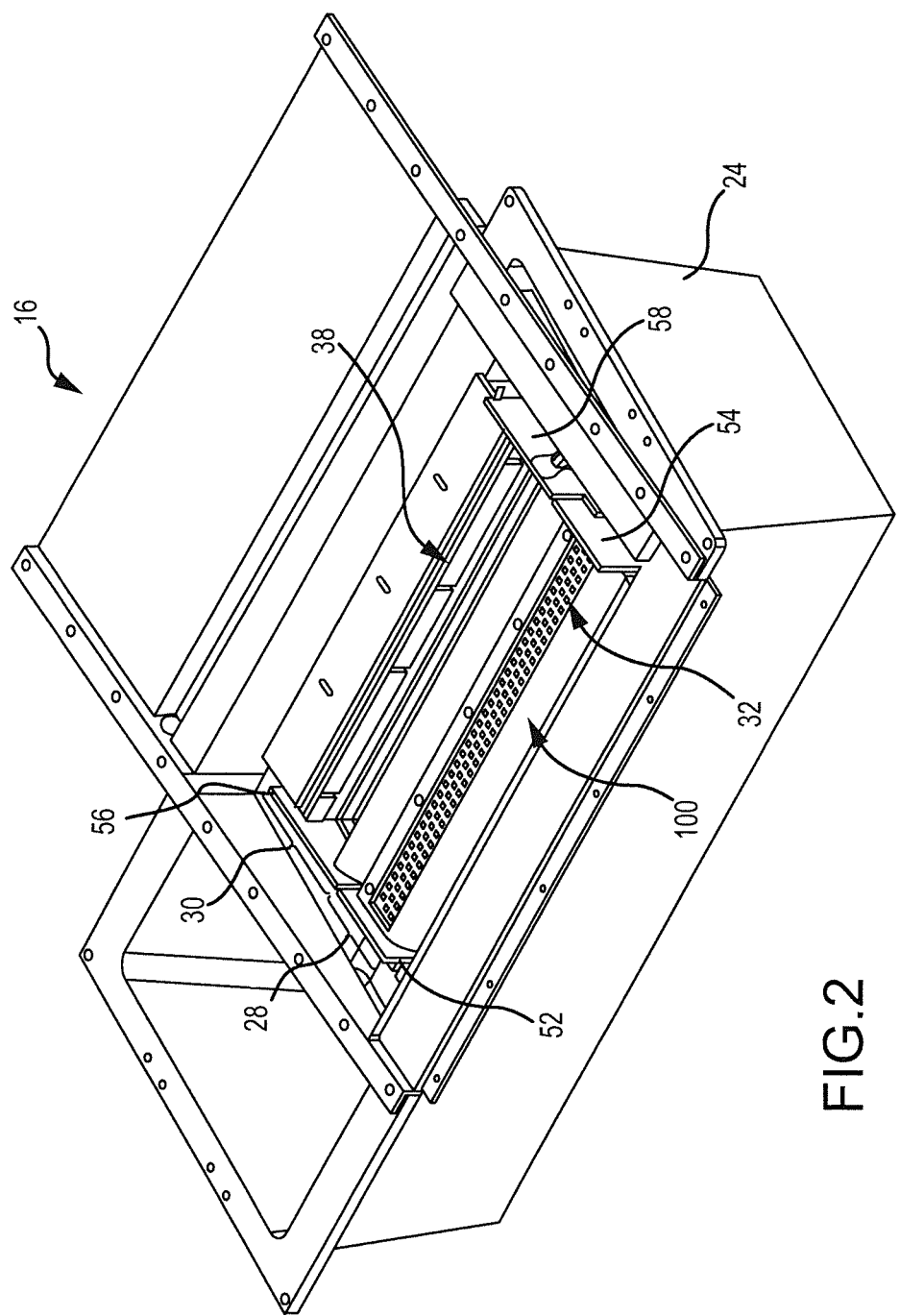
FIG. 2 is a perspective view of a wave soldering station of the wave soldering machine of FIG. 1.

Turning now to FIG. 2, the wave soldering station 16 is shown apart from the rest of the wave soldering apparatus 10. As shown, the wave soldering station 16 may include a solder bath or reservoir 24 that contains a supply of molten solder (e.g., lead-free solder, not shown). As used herein, the "solder bath" or "solder reservoir" may mean the walls or other structure containing the solder and may not necessarily include the solder itself. It should be appreciated that the solder reservoir 24, and even the wave soldering station 16 may, in general, be sometimes broadly referred to as a "solder pot." In any event, the wave soldering station 16 may also include a first wave soldering assembly 28 having a first nozzle 32 that extends up above solder contained within the solder reservoir 24, and a second wave soldering assembly 30 having a second nozzle 38 that extends up above solder contained within the solder reservoir 24.

The first nozzle 32 may produce a "first wave" of solder which may be a turbulent wave, a chip wave, and/or the like, and may be useful for obtaining an initial coverage of solder on the various components of the electronic substrate 20. The second nozzle 38 may produce a "main wave" which also may be any appropriate type of wave and in some instances may produce a smoother wave than that produced by the first nozzle 32. One or more of the first and second nozzles 32, 38 may produce a rotary chip wave (e.g., about 1 inch wide) and/or a wide chip wave (e.g., about 2½ inches wide). The first wave soldering assembly 28 may include first and second side plates 52, 54 extending upwards generally perpendicularly from the first nozzle 32 for limiting the amount of solder that can drip over the lateral sides of the first wave soldering assembly 28. Similarly, the second wave soldering assembly 30 may also include first and second side plates 56, 58 for limiting the amount of solder that can drip over the lateral sides of the second wave soldering assembly 32.

Although not illustrated, each of the first and second wave soldering assemblies 28, 30 may include one or more pumps to pump solder from the solder reservoir 24 through any appropriate ducting to the first and second nozzles 32, 38 to create the first and main waves. It should be appreciated that the controller (not shown, discussed above) may be used to control operation of the pumps to adjust a height, flow rate, etc. of the first and main waves. Additionally, although two wave soldering assemblies 28, 30 are illustrated, the principles taught herein may be applied to wave soldering machines incorporating only a single wave soldering assembly or wave soldering machines incorporating more than two wave soldering assemblies. A solder return apparatus 100 is partially illustrated in FIG. 2, and serves to return solder to the solder reservoir 24 while reducing the amount of solder that can splash and stick (e.g., in the form of solder balls) onto components of the wave soldering machine 10, electronic substrates 20 within the wave soldering machine 10, and/or the like. This solder return apparatus 100 will be described more fully below.

Figure 3:
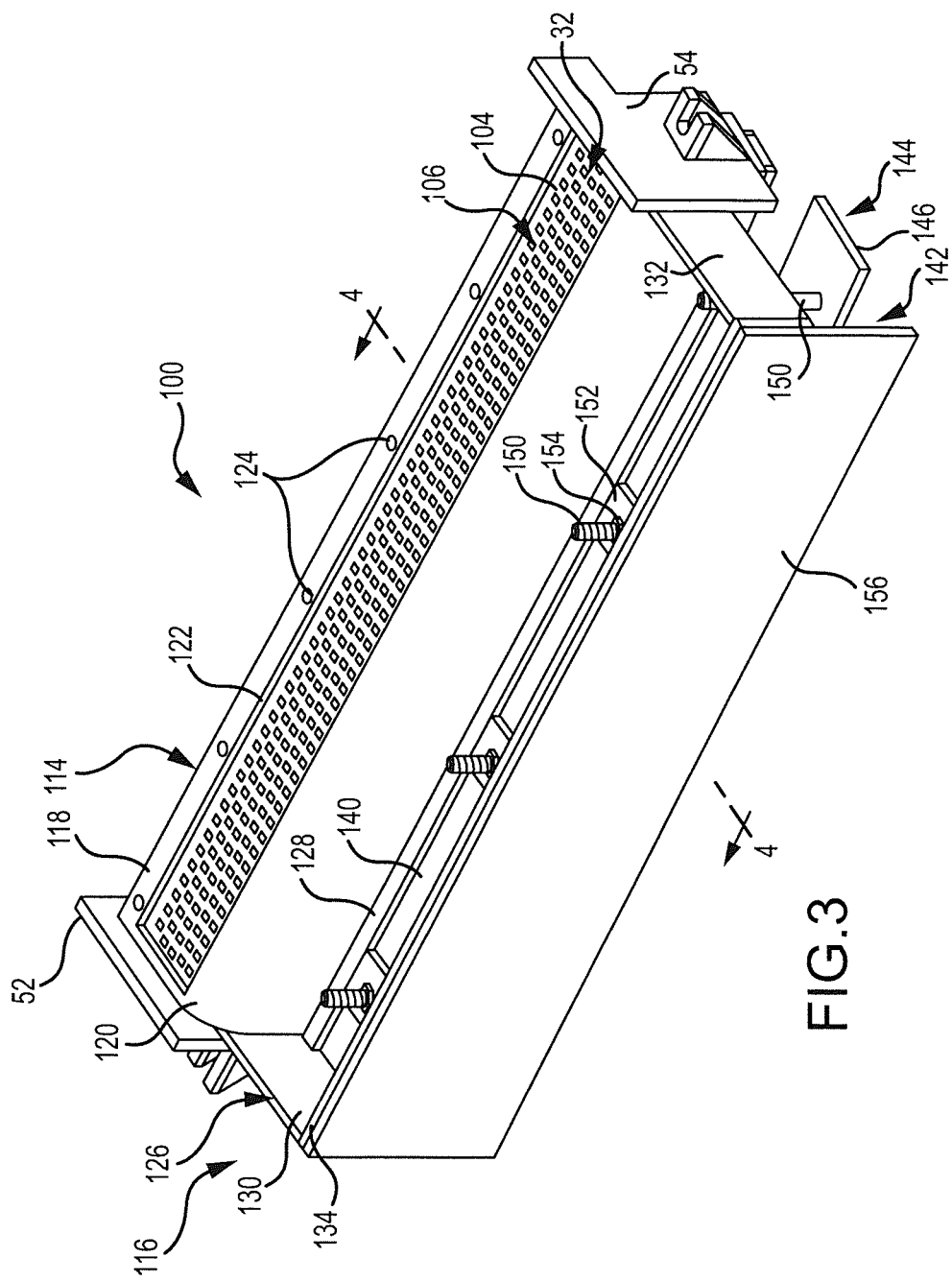
FIG. 3 is a perspective view of a solder nozzle and a solder return apparatus of the wave soldering station of FIG. 2.
Figure 4:
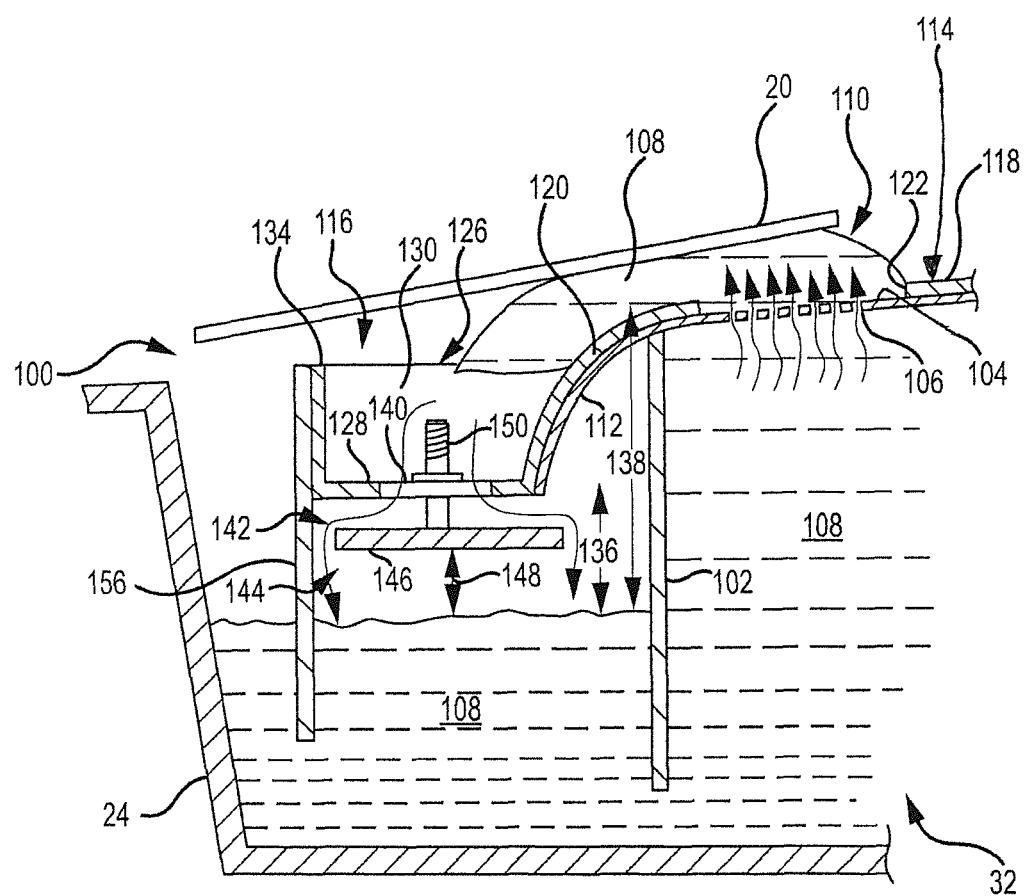
FIG. 4 is a sectional view of the solder nozzle and a solder return apparatus along the lines 4-4 of FIG. 3, the apparatus being disposed within a solder reservoir.

With reference now to FIGS. 3 and 4, one embodiment of a solder return apparatus 100 is illustrated as being mounted onto the first nozzle 32, although it should be appreciated that the solder return apparatus 100 could also be mounted to the second nozzle 38 of the second wave soldering assembly 30 or other nozzles (the second nozzle 38 of second wave soldering assembly 30 being shown in FIG. 2). In any event and with initial reference to the first nozzle 32, the first nozzle 32 includes a front wall 102 and a rear wall (not illustrated), each of which may extend into and be appropriately secured within the solder reservoir 24. The first nozzle 32 also includes a top or upper surface 104 including one or more apertures 106 through which solder exits or is expelled to form a wave 110 (e.g., first wave). The front and rear walls may serve to contain solder as it travels from the solder reservoir 24 through the one or more apertures 106. The first nozzle 32 may also include a front flange 112 over which solder may flow or travel back into the solder reservoir 24 in the absence of the solder return apparatus 100.

It has been discovered (in the absence of the solder return apparatus 100) that solder 108 cascading off the solder nozzle 32 (e.g., off the front flange 112) directly into the solder 108 in the solder reservoir 24 (i.e., the solder 108 contacts nothing between the time it leaves the solder nozzle 32 and contacts the solder 108 in the solder reservoir 24) splashes upon impact with the solder 108 in the solder reservoir 24. This is in large part due to the velocity (and momentum) the solder 108 has attained by the time it reaches the solder 108 in the solder reservoir 24 after it cascades off the first nozzle 32. The splashing solder 108 has been shown to contact and stick to components of the wave soldering apparatus 10 (e.g., the nitrogen hood) and the electronic substrate 20 causing solder balls and droplets. For instance, it has been discovered that solder balls can form under components of the electronic substrate (e.g. SMT, BGA) which can cause metal shorts (e.g., between legs of fine pitch SMT components). The splashing solder 108 may result in wasted solder, high defects rates in relation to the electronic substrates 20, and the like. As will be discussed in more detail below, use of the solder return apparatus 100 may reduce the aforementioned splashing of solder and/or limit the effects of any splashing that does occur which may reduce the wasting of solder and electronic substrate defect rates, among other advantages.

The solder return apparatus 100 may broadly include a mounting member or section 114 for mounting (e.g., permanently, removably) the apparatus 100 to the first nozzle 32 and a collection member or section 116 for receiving the solder 108 from the first nozzle 32 and returning the solder 108 to the solder reservoir 24. The mounting section 114 may be in the form of a plate that may be laid or otherwise draped over the first nozzle 32. More specifically, the mounting section 114 may include a first segment 118 that may be mounted and/or laid over the upper surface 104 of the first nozzle 32 and second segment 120 that may be mounted and/or laid over the front flange 112 of the first nozzle 32. The first segment 118 may include at least one aperture 122 that may be aligned with the one or more apertures 106 in the upper surface 104 of the first nozzle 32 to thereby allow solder to well up through the apertures 106 and the aperture 122 to form the wave 110.

The first segment 118 may also include any appropriate mounting mechanism for mounting the mounting section 114 (and thereby the apparatus 100) to the first nozzle 32. For instance, the mounting mechanism may be in the form of one or more bores 124 that extend through the first segment 118 (e.g., from a top to a bottom surface of the first segment 118). Corresponding bores (not shown) may be formed in the upper surface 104 of the first nozzle 32. In assembly, the first segment 118 may be laid over the upper surface 104 such that the aperture 122 is at least generally aligned over the apertures 106 and the bores 124 are at least generally aligned over the corresponding bores in the upper surface 104. The bores 124 and those in the upper surface 104 may be threaded. In any event, fasteners (e.g., threaded bolts) may be extended through the bores 124 and those in the upper surface 104 to secure the apparatus 100 to the first nozzle 32. Other mounting mechanisms are also envisioned such as snaps, detents, and/or the like.

The second segment 120 may be designed to generally follow the shape of the front flange 112 of the first nozzle 32 so as to hang over the front flange 112. With particular reference to FIG. 4, each of the second segment 120 and front flange 112 may be of a generally curvilinear shape or design that slopes generally from the upper surface 104 of the first nozzle 32 towards a bottom of the solder reservoir 24. Matching or generally matching the profile or shape of the second segment 120 to the front flange 112 allows the apparatus 100 to achieve a more stable fit when it is mounted over the first nozzle 32. Additionally, this allows solder 108 rising through the upper surface 104 to return to the solder reservoir 24 at a decreased velocity (e.g., more gradually as compared to the solder 108 leaving the upper surface without the front flange 112 and second segment 120 and cascading directly into the solder reservoir 24). It should be appreciated that the second segment 120 may have such a curvilinear or sloped design even in the absence of the first nozzle 32 having a front flange 112.

Additionally and with particular reference to FIG. 3, the mounting section 114 may be of a length or width (depending upon one's perspective) such that it extends substantially from one end of the upper surface 104 to the other end (e.g., from the first side plate 52 to the second side plate 54), or otherwise covers substantially the entire area where solder 108 flows out of the apertures 106. This may allow the apparatus 100 to pass substantially all solder 108 exiting the first nozzle 32 into the collection section 116 for eventual transfer to the solder reservoir 24.

With continued reference to FIGS. 3 and 4, the collection section 116 may be appropriately connected or attached to the mounting section 114 (e.g., via welding, as part of a casting process) in such a manner that solder 108 welling up through the apertures 106, 122 pours or flows over the second segment 120 and into the collection section 116 (e.g., as in FIG. 4). Broadly, the collection section 116 may include a trough 126 (e.g., cup, receiving area) for collecting and/or containing an initial runoff of the solder 108 from the first nozzle 32. The trough 126 may be of any appropriate form including a bottom wall 128 and a number of walls extending upwardly therefrom (e.g., first and second end caps or side walls 130, 132 and front wall 134). The trough 126 may be considered an "upper stage" of the collection section 116. The trough 126 may be located about halfway of the distance that solder 108 needs to drop to return to the solder reservoir 24. That is and with particular reference to FIG. 4, a distance 136 from a top of the solder 108 in the solder reservoir 24 to the bottom wall 128 may be about half of a distance 138 from the top of the solder 108 in the solder reservoir 24 to the area (e.g., upper surface 104) at which the solder 108 cascades from the first nozzle 32. This may allow the trough 126 to reduce the velocity and momentum of the solder 108 which may reduce splashing when the solder 108 eventually contacts the solder 108 in the solder reservoir 24. Additionally, such relative positioning of the trough 126 may sufficiently contain the solder 108 (i.e., limit the solder 108 from flowing over the side and front walls 130, 132, 134). Other locations of the trough 126 relative to the upper surface 104 and the top surface of the solder 108 in the solder reservoir 24 are also envisioned.

With reference again to FIGS. 3 and 4, the bottom wall 128 may include at least one aperture, opening or slot 140 therethrough that allows solder 108 received in the trough 126 to eventually flow into the solder reservoir 24. The slot 140 may extend substantially from the first side wall 130 to the second side wall 132 although other slot shapes and designs are encompassed within this disclosure. For instance, a number of slots may be defined through the bottom wall 128 each of which extends generally from the front wall 134 towards the second segment 120. In any event, solder 108 passing through the slot 140 flows into a chamber 142 (e.g., a "lower stage") which may serve to reduce and contain splashing of the solder 108 and return the solder 108 to the solder reservoir 24 as will be described below.

The chamber 142 may be at least partially defined by the bottom wall 128 and any appropriate flow control member 144. The flow control member 144 serves to adjustably control a quantity of solder 108 exiting the slot 140. Additionally, the flow control member 144 may serve as a "second step" (the bottom wall 128 of the trough 126 being the "first step") that again serves to reduce the velocity of solder 108 exiting the slot 140 because the solder 108 first contacts the flow control member 144 instead of falling directly from the slot 140 into the solder 108 in the solder reservoir 24. For instance, the flow control member 144 may be in the form of an adjustable plate 146 having a length and width at least about as great as a length and width of the slot 140.

With reference to FIG. 4, the adjustable plate 146 may be selectively movable towards and away from the slot 140 along a path 148. For instance, positioning of the adjustable plate 146 closer to the slot 140 may serve to reduce the quantity of solder 108 exiting the slot 140 while positioning of the adjustable plate 146 farther away from the slot 140 may serve to increase the quantity of solder 108 exiting the slot 140. Additionally, positioning of the adjustable plate 146 closer to the slot 140 may allow the solder 108 to attain a first velocity after leaving the adjustable plate 146 and before contacting the solder 108 in the solder reservoir 24 while positioning of the adjustable plate 146 farther away from the slot 140 may allow the solder 108 to attain a second velocity after leaving the adjustable plate 146 and before contacting the solder 108 in the solder reservoir 24 that is less than the first velocity. This may result from the solder 108 having a shorter distance to drop when the adjustable plate 146 is farther away from the slot 140 compared to when the adjustable plate 146 is closer to the slot 140. It should be appreciated that the adjustable plate 146 may be appropriately positioned based on a number of factors including but not limited to the flow rate and type of solder 108 or other liquid exiting the first nozzle 32, the distance 136 between the bottom wall 128 and the solder 108 in the solder reservoir 24, and/or the like. Additionally, while the adjustable plate 146 has been shown to be generally parallel to the bottom wall 128 of the trough 126, other orientations are also contemplated.

As illustrated, adjustability of the plate 146 may be provided by way of a number of fasteners 150 (e.g., threaded fasteners or studs) that are respectively inserted through portions of the trough 126. For instance, each fastener 150 may be appropriately secured (e.g., rigidly) to a surface of the adjustable plate 146 (e.g., via welding, riveting) so as to extend or protrude away from such surface. The trough 126 may include a number of mounting tabs 152 (e.g., stiffening ribs) that are appropriately formed or positioned in the slot 140, each having at least one aperture (not shown) that is adapted to receive a fastener 150. Additionally, a threaded nut 154 may be disposed or positioned on each mounting tab 152 over the apertures also for receipt of a fastener 150.

In assembly, the fasteners 150 may initially be positioned through the apertures of the mounting tabs 152 in a direction from the bottom wall 128 towards a top of the trough 126 where soldier would enter the trough 126. Thereafter, the nuts 154 may be threaded over the ends of the fasteners 150 to a desired location on the fasteners 150, and then the operator may release the adjustable plate 146 and fasteners 150 such that the nuts 154 on top of the mounting tabs 152 rest on top of the mounting tabs 152 and the adjustable plate 146 hangs below the bottom wall 128. Thereafter, adjustment of the adjustable plate 146 towards and away from the slot 140 may be accomplished by selectively rotating one or more of the nuts 154 clockwise or counterclockwise. It should be noted that the fasteners 150 need not necessarily be extended through apertures on mounting tabs 154 disposed within the slot 140. For instance, the slot 140 may be free of mounting tabs 154, and the fasteners 150 may be extended through apertures that extend through the bottom wall 128. Other arrangements are also encompassed by this disclosure.

As mentioned previously, the chamber 142 may be at least partially defined by the bottom wall 128 and the adjustable plate 146. Additionally, the chamber 142 may include other features that serve to limit solder droplets from contacting the electronic substrate 20, other components of the wave soldering apparatus 10, and/or the like. For instance, a deflection plate 156 may be appropriately mounted or formed as part of the collection section 116 and may further define the chamber 142. The deflection plate 156 may be mounted to (e.g., via welding) or form part of the front wall 134 and extend downwardly therefrom. As shown, the deflection plate 156 may be designed or be of such dimensions such that it extends into the solder 108 of the solder reservoir 24, and may be generally perpendicular to the top surface of the solder 108 in the solder reservoir 24 and/or the adjustable plate 146. In some variations, the deflection plate 156 may be disposed at angles other than about 90° relative to the top surface of the solder 108 in the solder reservoir 24.

With particular reference now to FIG. 4, it can be seen that solder 108 flowing through the slot 140 is substantially limited in its ability to splash outwards towards unintended components by way of the chamber 142. More specifically, the chamber 142 may be defined by the bottom wall 128 which generally faces the adjustable plate 146, and the front wall 102 of the first nozzle 32 which generally faces the deflection plate 156. The chamber 142 may serve to at least partially shield the electronic substrate 20 and other components of the wave soldering apparatus 10 from splashing solder 108. Turning back to FIG. 3 and although not illustrated, it is further contemplated that similar deflection plates could be mounted to the first and second side walls 130, 132 and designed so as to extend into or close to the solder 108 of the solder reservoir 24 to limit solder 108 from splashing or spraying laterally away from the collection section 116. In any event and with reference to FIG. 4, solder 108 exiting the trough 126 via the slot 140 may be directed over the adjustable plate 146 and into the solder reservoir 24 for eventual return to the first wave soldering assembly 28 and the first nozzle 32 whereby the solder 108 can again form the wave 110.

Figure 5:
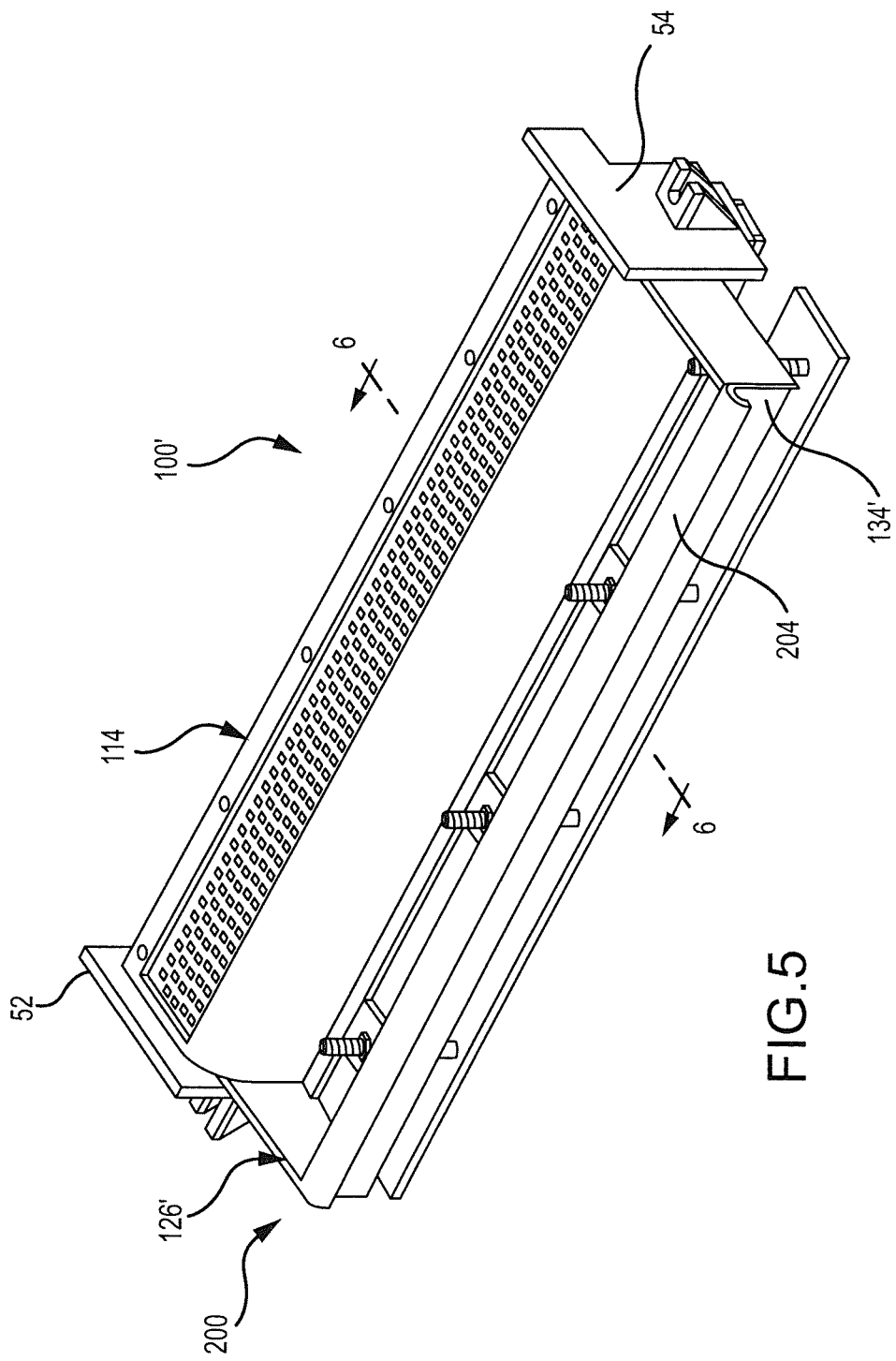
FIG. 5 is a perspective view of a solder nozzle and a solder return apparatus of the wave soldering station of FIG. 2 according to another embodiment.
Figure 6:
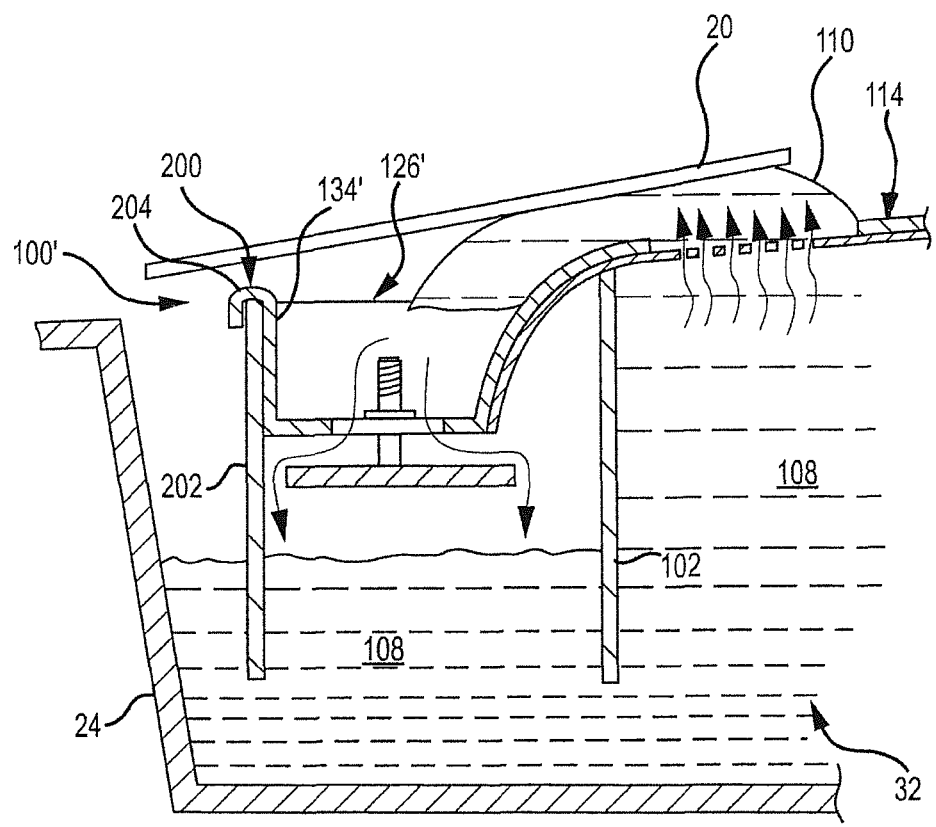
FIG. 6 is a sectional view of the solder nozzle and solder return apparatus along the lines 6-6 of FIG. 5, the apparatus being disposed within a solder reservoir.

Turning now to FIGS. 5 and 6, another embodiment of a solder return apparatus 100' is illustrated for returning solder 108 to the solder reservoir 24 while limiting the ability of the solder 108 to splash and spray onto the electronic substrate 20 and other components. Corresponding components between the embodiments of FIGS. 3-4 and 5-6 are identified by common reference numerals. Those corresponding components that differ in at least some respect from the embodiment of FIGS. 3-4 are identified by a "single prime" designation in FIGS. 5-6. As with the apparatus 100, the one or more components of the apparatus 100' may be of any appropriate size, shape, configuration and/or type. One difference between the apparatus 100 of FIGS. 3-4 and the apparatus 100' of FIGS. 5-6 is a quick-mount member 200 that may serve to mount (e.g., removably) the collection member 116 to a preexisting structure of the first nozzle 32 and/or the solder reservoir 24.

With reference to FIG. 6, it can be seen that a preexisting structure such as a wall 202 extends upwardly out of the solder 108 in the solder reservoir 24 and may be considered a portion of the solder reservoir 24 or even the first nozzle 32. The wall 202 may be appropriately mounted within or form a part of the solder reservoir 24 or the first nozzle 32 so as to protrude upwardly out of and/or away from the solder 108 in the solder reservoir. For instance, the quick mount member 200 may be a hook member 204 that is appropriately interconnected to the front wall 134' of the trough 126' (e.g., via welding, as part of the manufacturing process) and/or integrally formed therewith. The hook member 204 may be hung over the wall 202 as part of the process of mounting the apparatus 100' to the first nozzle 32. Once the hook member 204 has been hanged over or attached to the wall 202, the wall 202 may serve a similar purpose to the deflection plate 156 discussed in relation to FIGS. 3-4. The apparatus 100' may be useful as part of a rotary chip wave arrangement or any other arrangement including a preexisting structure over which the quick-mount member 200 can be attached. Additionally, the quick-mount member 200 may include other structures and arrangements such as apertures and bolts, tabs, and/or the like.

Many other arrangements of the apparatuses 100, 100' discussed herein are also envisioned. In one arrangement, either of the apparatuses 100, 100' could include a second collection section 116, 116' attached to a rear side of the mounting section 114 which could be a mirror image of the first collection section 116, 116' and be designed to hang off a rear side of the first nozzle 32 or any other nozzle that may utilize the apparatuses 100, 100'. This may advantageously serve to collect and contain solder 108 that has flowed off a back or rear side of the nozzle and return such solder back to the solder reservoir 24. In one variation, an apparatus could have a collection section 116 on one side and a collection section 116' on the other side.

In another arrangement, multiple apparatuses 100, 100' could be attached to the same nozzle. For instance, one apparatus 100 or 100' could be mounted onto a nozzle for collecting solder runoff on the front side of the nozzle, and then a second apparatus 100 or 100' could be mounted onto the nozzle for collecting solder runoff on the back side of the nozzle. The respective mounting sections 114 of the two apparatuses 100 and/or 100' could have aligned holes such that fasteners could be inserted through the aligned holes and then into the upper surface 104 of the first nozzle 32 or other nozzle. It should also be appreciated that the apparatuses disclosed herein are not limited to use with solder and may be used in conjunction with nozzles expelling or releasing other types of flowing liquids in situations where it may be advantageous to control return of the liquids to a source or other location while limiting the splashing or spraying of the liquid into unintended locations.

The apparatuses disclosed herein can be constructed of any appropriate materials and combinations of such materials via any appropriate manufacturing methods. For instance, the apparatuses may be constructed of any sturdy materials that limit the degree to which solder can stick to the surface of the apparatus. Materials such as stainless steel, titanium and/or the like have been found to be suitable materials. Additionally, any appropriate manufacturing methods and combinations of such methods may be utilized to construct the apparatuses such as casting, forming, machining, welding and/or the like.

Figure 7:
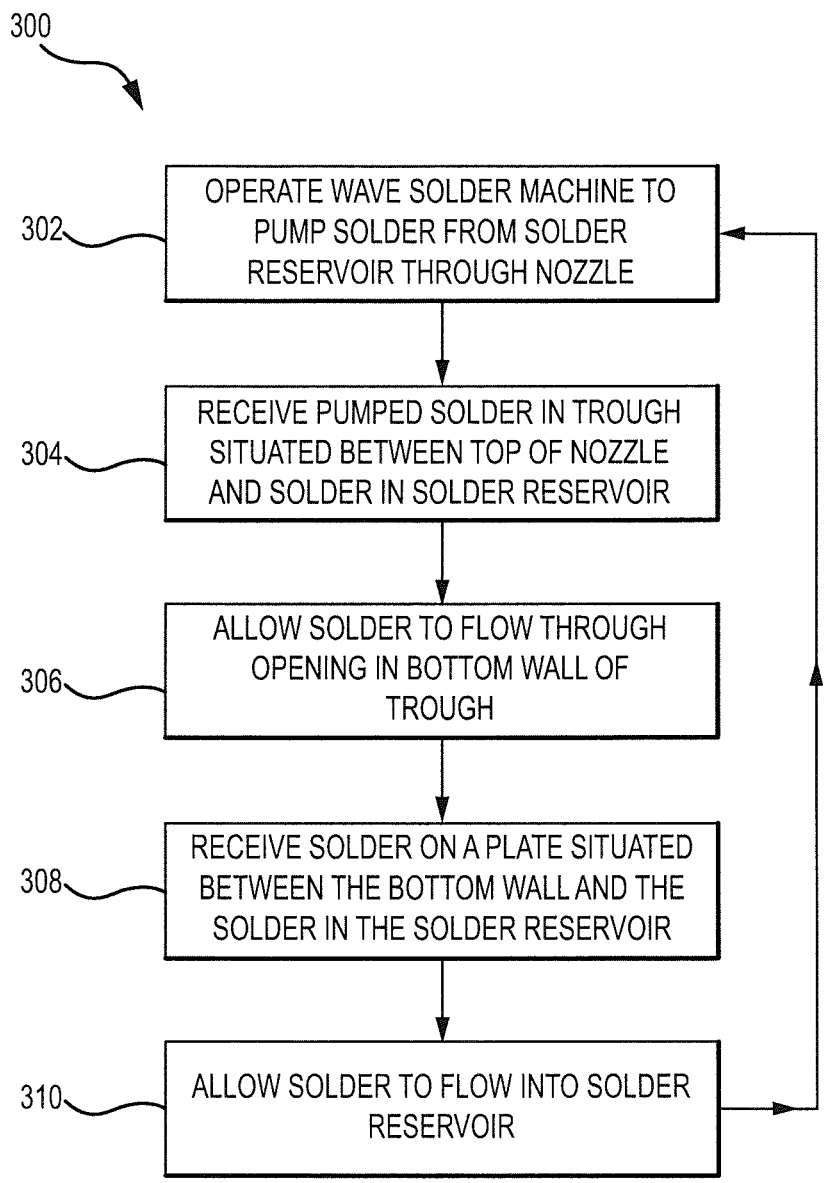
FIG. 7 is a flowchart illustrating a method of using a wave soldering machine using any of the solder return apparatuses disclosed herein.

Turning now to FIG. 7, one method (300) of using a wave soldering machine (e.g., in conjunction with one of the apparatuses disclosed herein) is disclosed although it should be appreciated that other methods of use are also envisioned. Initially a wave solder machine may be operated (302) to pump solder from a solder reservoir through at least one aperture of a solder nozzle to form a solder wave (e.g., wave 110 in FIGS. 4 and 6). The solder may be received (304) from the wave in a trough that is interconnected to the solder nozzle and generally situated between the nozzle and the solder in the solder reservoir. See trough 126, 126' in FIGS. 3-6. For instance, a bottom wall of the trough may be located about halfway between an upper surface of the nozzle and the solder in the solder reservoir. The solder may be allowed to flow (306) through an opening (e.g., an elongated slot) in the bottom wall of the trough and towards the solder reservoir.

The solder may be received (308) on a plate and then allowed (310) to flow into the solder reservoir whereby the wave solder machine can continue to be operated (302) to pump solder from the reservoir through the nozzle. The plate may be situated below the bottom wall of the trough and above the solder in the solder reservoir. In this regard, the solder may be thought of as traveling over a series of "steps" (e.g., the bottom wall, the plate) that serve to gradually reduce the velocity of the solder and contain the solder on its return to the solder reservoir from the nozzle to limit the solder from splashing or spraying onto an electronic substrate and/or components of the wave soldering machine.

At any appropriate time (e.g., once the solder wave has been created), an electronic substrate may be sent past the solder wave (e.g., via a conveyor) such that, for instance, a lower or bottom surface of the substrate contacts the wave. See electronic substrate 20 traveling through wave 110 in FIG. 4. Additionally, the plate may be adjusted towards and/or away from the opening in the bottom wall of the trough to any desired position. For instance, if too much solder is filling the trough such that solder is flowing over one or more walls of the tough, the plate can be adjusted away from the bottom wall to increase the rate at which solder empties the trough. If solder is exiting the trough too quickly such that solder is somehow splashing on its return to the solder reservoir in a manner that allows solder droplets to contact electronic substrates and/or wave soldering machine components, the plate can be adjusted towards the bottom wall to reduce the flow rate of solder exiting the trough. Operators may readily determine an appropriate position of the plate relative to the trough and/or the solder in the solder reservoir.

The inventors have found that without using the solder return apparatuses disclosed herein, splashing solder (e.g., resulting from the solder cascading over the front of the solder nozzle directly into the solder reservoir with nothing slowing down the solder in between) can contact wave soldering machine components (e.g., nitrogen hoods) and electronic substrates (e.g., printed circuit boards) creating solder balls on such components and substrates. In the case of printed circuit boards, solder balls can get under components (e.g., SMT, BGA) causing metal shorts and hence high defect rates in relation to the printed circuit boards as a whole. However, use of the solder return apparatuses disclosed herein has been shown to reduce such splashing of solder and reduce the aforementioned high defect rates which may result in higher profitability for companies and organizations utilizing wave soldering machines.

The features described herein present numerous advantages when used in situations where it is desirable to reduce splashing and spraying of a liquid as it leaves or is expelled from a nozzle or other similar structure. As noted above, the curvilinear design of the second segment of the mounting section initially slows down the solder after it has left the nozzle as it travels towards the solder reservoir. The trough of the collection section is situated at a distance higher than the solder reservoir but below the upper surface of the solder nozzle which provides an initial receiving area for the solder that reduces the velocity of the solder before its eventual entry into the solder in the solder reservoir. The one or more openings/slots in the bottom wall of the trough allow the solder to enter a substantially shielded chamber, and a flow control member such as a plate may be adjusted towards and away from the opening/slot to control the quantity of solder exiting the slot. The flow control member also serves to reduce the velocity of the solder on its travel between the trough and the solder in the solder reservoir as the solder contacts the flow control member before it eventually drops into the solder in the solder reservoir; this may further serve to limit splashing. One or more deflection plates may extend into the solder in the solder reservoir to further any solder balls and droplets generated from the solder entering the solder reservoir from contacting electronic substrates and other components.

While only a single flow control member has been discussed herein, it is envisioned that additional flow control members could be included as part of the solder return apparatuses 100, 100'. For instance, a second flow control member (e.g., adjustable plate) could be adjustably mounted below the first flow control member (e.g., via one or more threaded fasteners) and could form a "third step" over which the solder 108 travels to further reduce the velocity of the solder 108 before its return to the solder in the solder reservoir.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular (e.g., indicating that the device includes "the collection section" alone does not mean that the device includes only a single collection section). Moreover, any failure to use phrases such as "at least one" also does not limit the corresponding feature to the singular (e.g., indicating that a container includes "a collection section" alone does not mean that the container includes only a single collection section). Use of the phrase "at least generally," "at least partially," "substantially" or the like in relation to a particular feature encompasses the corresponding characteristic and insubstantial variations thereof. For example, a plate that is "substantially perpendicular" to something else covers both an insubstantial variation of the plate being perpendicular in addition to the plate being perpendicular. Finally, a reference of a feature in conjunction with the phrase "in one embodiment" does not limit the use of the feature to a single embodiment.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed:

1. An apparatus, comprising:
    a mounting member for mounting the apparatus to a nozzle; and
    a collection member interconnected to the mounting member, wherein the collection member is operable to receive liquid from the nozzle and pass liquid to a reservoir, the collection member comprising:
        a trough for receiving liquid from the nozzle, the trough comprising:
            a bottom wall; and
            at least one slot within the bottom wall for allowing liquid to pass out of the trough; and
        a flow control member that is mounted to the trough and adjustable relative to the at least one slot below the trough, wherein the bottom wall and the flow control member at least partially define a chamber for receiving liquid from the trough and passing liquid into the reservoir.

2. The apparatus of claim 1, wherein the mounting member comprises an aperture that is sized to rest over a top surface of the nozzle.

3. The apparatus of claim 2, wherein the aperture allows liquid to pass from the nozzle into the collection member.

4. The apparatus of claim 1, wherein the mounting member comprises an elongated plate that is sized to substantially cover a top surface of the nozzle.

5. The apparatus of claim 1, wherein the mounting member is sized to hang over a front flange of the nozzle.

6. The apparatus of claim 1, wherein the trough further comprises first and second end walls and a front wall, each of which extends upwardly from the bottom wall, wherein the first and second end walls, the front wall and the bottom wall define a receiving area for receiving liquid from the nozzle.

7. The apparatus of claim 6, further comprising a deflection plate interconnected to the trough that is operable to extend into the reservoir.

8. The apparatus of claim 7, wherein the deflection plate is mounted to the front wall.

9. The apparatus of claim 7, wherein the deflection plate is substantially perpendicular to at least one of the bottom wall and the flow control member.

10. The apparatus of claim 7, wherein the deflection plate further defines the chamber.

11. The apparatus of claim 6, wherein the front wall comprises a hook member on an upper portion thereof opposite from the bottom wall.

12. The apparatus of claim 1, wherein the flow control member comprises an elongated plate.

13. An apparatus, comprising:
    a mounting member for mounting the apparatus to a nozzle; and
    a collection member interconnected to the mounting member, wherein the collection member is operable to receive liquid from the nozzle and pass liquid to a reservoir, the collection member comprising:
        a trough for receiving liquid from the nozzle, the trough comprising:
            a bottom wall; and
            at least one slot within the bottom wall for allowing liquid to pass out of the trough; and
        a flow control member that is mounted to the trough and adjustable relative to the at least one slot below the trough, wherein the bottom wall and the flow control member at least partially define a chamber for receiving liquid from the trough and passing liquid into the reservoir wherein the flow control member comprises at least one fastener extending substantially perpendicularly therefrom, wherein the at least one fastener adjustably interconnects the flow control member to the trough.

14. The apparatus of claim 13, wherein the at least one fastener extends through the at least one slot.

15. The apparatus of claim 14, further comprising a mounting tab that is disposed within the at least one slot, wherein the at least one fastener extends through the mounting tab.

* * * * *